May 30, 1939.　　　J. A. B. SMITH　　　2,160,254
TYPEWRITING MACHINE
Filed June 26, 1936　　　6 Sheets-Sheet 1

May 30, 1939. J. A. B. SMITH 2,160,254
TYPEWRITING MACHINE
Filed June 26, 1936 6 Sheets-Sheet 2

INVENTOR:
Jesse A. B. Smith
BY B C Stickney
ATTORNEY

May 30, 1939.　　　　J. A. B. SMITH　　　　2,160,254
TYPEWRITING MACHINE
Filed June 26, 1936　　　　6 Sheets-Sheet 5

INVENTOR:
Jesse A B Smith
BY B C Stickney
ATTORNEY.

Patented May 30, 1939

2,160,254

UNITED STATES PATENT OFFICE 2,160,254

TYPEWRITING MACHINE

Jesse A. B. Smith, Stamford, Conn., assignor to Underwood Elliott Fisher Company, New York, N. Y., a corporation of Delaware Application June 26, 1936, Serial No. 87,341

23 Claims. (Cl. 197—63)

This invention relates to typewriting machines and in particular to margin and paragraph tabulating stop-mechanism which can be quickly conditioned to vary the necessary stop-positions of a typewriter carriage for different arrangements of typed matter.

In the typing of letters, for example, it is desirable that the typed matter be arranged on the work-sheet in accordance with the length of the letter. To present a neat and balanced appearance, a short letter should have wide margins and deep paragraph indentations while medium and long letters should have proportionately narrower margins and shallower paragraph indentations. A typist in the ordinary course of the day's work cannot readily select letters of nearly the same length for typing at the same time. The arrangement on the work-sheet of letters of varying length has, therefore, been governed largely by the judgment of the typist. Where long letter-typing experience is lacking letters are turned out that are not located properly on the work-sheet, that is, the margins are uneven and the closing and date lines begin too far in from either margin so that a ragged right-hand margin results and the letters have a slovenly appearance.

The tabulating stop-rack common on typing machines provides for a single stop set-up. The time necessary to change the stop arrangement to afford proper paragraph and margin spacing for work taken at random is considerable. As a result the operator only uses the tabulator-stop rack for special work, preferring to roughly estimate the necessary spacing of typing work rather than bother with the time consuming operation of setting stops for each type of letter or work to be done.

It is an object of the invention therefore to incorporate in a typewriter, a time-saving margin, paragraph and column tabulating mechanism which can be quickly actuated to condition different stop set-ups so that short, medium or long letters as well as statistical work can be typed in any sequence by merely operating suitably designated keys of the keyboard to properly margin and paragraph the work to be typed in accordance with the length thereof.

Further objects of the invention include the provision of a special bank of keys on the keyboard above the usual keys for quick selection of the stop set-up desired. Revolving or adjustable racks that required setting to predetermined positions by a knob or other device, particularly when located at the rear of the machine, have heretofore put the burden of making a mechanical manipulation on the typist as well as of using care to see that the proper adjustment has been made. This resulted in the typist shirking the mechanical work necessary in conditioning the rack and resorting to judgment in turning out the work. With the use of the novel special keys for the purpose of conditioning the rack, which keys are a part of the keyboard, the rack requires no attention from the typist after the settable stops are once positioned on the faces of the rack to take care of the various forms of work the typist will generally do. Operation of any key will selectively condition the rack instantly so that matter to be typed will be prearranged on the work-sheet by the relative positions of the margin and intermediate stops on the key-selected face of the rack. A single tabulator-key controls the stop-positions of the carriage as the work proceeds and all the keys of the special key-bank are distinctly located for easy manipulation.

Also, on each face of the rack, right and left hand margin-stops are employed as well as intermediate column-stops, so that the use of a separate margin-stop rack is dispensed with and the consequent separate adjustment of the margin-stops is obviated. The use of both on a single rack-face makes it possible for the operator to take care of the setting of the margin and intermediate stops at the same time. Also, certain teeth on each rack-face may be marked or colored to facilitate the setting of the stops for the different work, it being understood that any stop-setting is possible, but the average positions of the stops for each type of work are so indicated. Also, in the construction, it is desirable that the parts be supported as far as possible on the frame of the machine so that the carriage will be reduced in weight and the impact of blows dealt the colliding stops in arresting the tabulating movements of the carriage will be minimized. Accordingly the rack and all operating parts are mounted on the machine-frame as well as the counter-stop actuating means associated therewith, the counter-stop and bell being the only parts of the device that are mounted on the carriage and the weight thereof is negligible. The mounting of the rack for revolving movement instead of swinging movement facilitates the placing of the stops as the rack is clear of the counter-stop at all times. The rack is made more accessible by the use of a hinged section on the paper-table and the stops have side-edge serrations which make them easier to handle.

More particularly, the invention contemplates the use of a rack extending across the back of the typewriter and mounted in the stationary frame thereof for revolving and endwise movement. The rack, for example, rectangular in cross-section, is serrated in each of its faces to provide letter-spaced slots for the reception of settable stops. The stops on each face of the rack include end or margin stops and intermediate paragraph or column stops. The margin-stops project further from the faces of the rack than do the intermediate stops and normally engage a counter-stop mounted on the movable carriage of the typewriter.

Each face of the rack is numbered to correspond with a similarly designated key of the typewriter keyboard. If key number "1" is pressed preparatory to typing a letter of short length, suitable mechanism functions to revolve the rack so that face number "1" is uppermost or in stop-presenting position. The outer or end stops on face "1" which locate the margins are set to provide wide margins on the opposite edges of the work-sheet. The intermediate paragraph or column stops have been spaced to provide a deep paragraph indentation at the left side of the letter sheet, and a date and letter closing line position so that a wide right-hand margin will be maintained.

In like manner, each of the rack-faces "2" and "3" present marginal and intermediate stops providing for the proper arrangement or set-up of letters of medium and long length. Rack-face "4" presents margin and column stops for use in arranging statistical data or matter in column form on a work-sheet.

The typewriter keyboard having special keys numbered to correspond with the rack-faces facilitates the selection of stop-arrangements to conform to the work. Letters of varying length and statistical or columnar matter may be typed at random without the time-consuming operation of frequently setting paragraph and column stops. Operation of the special keys instantly conditions the rack so that the desired stop set-up is presented for controlling the carriage movements to marginal or intermediate positions.

The movement of the carriage of the typewriter is controlled by engagement of the margin and column stops of the rack with a counter-stop which is pivotally mounted on the carriage frame. The counter-stop extends rearwardly from the carriage frame in normally horizontal position, so that its detent or stop end overlies the rack for engagement by the margin-stops, but clearance by the intermediate or tabular stops. For engagement with the latter, the counter-stop is rocked on its pivot so that its stop-end tilts down. In order to pass the margin-stops, the counter-stop may be rocked so that its detent end tilts upwardly to clear said stops. This upward tilting is caused by a margin-release key while the downward tilting is caused by a tabulator-key.

Another feature of the invention, is the compact key and associated parts organization which provides suitably designated keys for selectively choosing the rack-face that carries the properly placed stops for prearranging the work. Also, a tabulator-key and margin-release key are included in said compact organization. Association of the parts is such that the margin-release mechanism is actuated automatically by operation of any of the rack-control keys in order to tilt the counter-stop on the carriage out of the way of the stops on the rack when the latter is revolved.

Also, the mounting of the rack for key-operated revolving movement as well as endwise movement is a feature in that engagement of the counter-stop with a paragraph or column stop moves the rack endwise against the resistance of a spring to not only afford a cushion for the carriage in tabulating movements, but to also actuate a line-lock device which remains effective when a right margin-stop is engaged and until the margin-release key is pressed.

Another feature of the invention is the mounting of the counter-stop so that it can be actuated at any position of travel of the carriage for tabulating, margin-release or stop-clearance when the rack is revolved.

While I have used letters as an illustration of the work that can be conveniently handled, it is to be understood that any typed matter of varying length is included within the scope of the invention and can be quickly and effectively prearranged on the work-sheet through the medium of the key-selected margin and tabulator mechanism.

Other features and advantages will hereinafter appear.

In the accompanying drawings,

Figures 12 to 17, inclusive, are diagram views showing the arrangement of one set of stops on one face of the stop-rack; Figure 12 showing the left margin-position of the margin-stop and abutting counter-stop; Figures 13 and 14 illustrating respectively the first and second tabulating positions which correspond to the paragraph and date or closing locations of the writing position. Figures 15 and 16 show respectively the bell-ringing position and abutment of the counter-stop with the margin-stop to effect endwise displacement of the stop-rack for line locking, and Figure 17 shows the release from abutting contact of the margin and counter stops so that writing beyond the set margin can be continued.

Figures 18, 19, 20 and 21 are diagram views of work-sheet arrangements exemplifying the set-up of stops on the different faces of the rack; Figure 18 showing a short letter having wide margins and deep paragraph indentations, Figures 19 and 20 illustrating in sequence letters of medium and long length having respectively medium and shallow margin and paragraph depths; and Figure 21 shows the arrangement of matter in column form.

Referring to the drawings in detail, 25 indicates type-keys constituting the keyboard of a typewriting machine having the usual frame 26. The keys 25 are mounted on key-levers 27 which, through the medium of bell-cranks 28, swing type-bars 29 upwardly to print on a work-sheet 35 on a platen 30. The platen is mounted in a platen-carriage 31, the movement of which, in one direction, is controlled by a letter-feeding rack 32 attached to the carriage by pivoted hand levers 33, said rack meshing with a pinion 34 connected to an escapement-wheel 36.

The movements of the wheel and carriage are controlled by the well-known escapement-dogs (not shown) which are actuated by a universal frame 37. A bar-portion 38 of said frame is engaged by a heel 39 of each type-bar 29 on a printing stroke of the latter to letter-feed the carriage 31. The carriage is connected by a band 40 to a source of power for letter-feeding propulsion along a track, one rail 41 of which is shown mounted at the rear of frame 26. This construction is substantially that employed in Underwood typewriting machines.

In order that the carriage may be stopped at predetermined points to provide margin paragraph and column printing positions on the work-sheet, reference is made to the stop-organization (Figure 1) which consists of a stop-rack 42, rectangular in cross-sectional shape, extending across the back of the typewriter and journaled as at 45 for rotary and endwise movement in bearing bosses 43 of brackets 44. The latter are secured to the typewriter frame by suitable screws and support carriage-rail 41. Throughout the major portion of its length, rack 42 is serrated to provide peripheral slots or grooves 46 which are separated a distance equal to one letter-space. The faces of stop-rack 42 are identified by numerals "1", "2", "3" and "4" and each face carries a set of spaced stops which may coact with a single counter-stop 47 on the movable carriage to control the movements of the latter. The stops of each face are identified as right and left hand margin-stops 48R, 48L respectively and intermediate paragraph or column tabulator-stops 49. Both margin and intermediate stops are readily slipped into slots 46 of stop-rack 42 and for this purpose are provided with yoke-ends 50 (Figures 7 and 9) which straddle the rack. The projecting end of each margin-stop is bent upon itself to provide a cam portion or ramp 51 on one side thereof, so that a carriage counter-stop 47 may ride thereover in one direction, and a flat abutting face 52 on the opposite side to prevent passage of the counter-stop. These margin-stops are reversible for use at the right or left hand side of the rack, it being understood that margin-stops 48R disposed at the left-hand side of rack 42 provide a right-hand margin on the work-sheet and margin-stops 48L disposed at the right-hand side of the rack provide a left-hand margin on the work-sheet. The projecting ends or extensions of the intermediate tabulator-stops 49 provide plain tabs or lugs 53 for engagement by counter-stop 47 and stops 49 may be used at either side of the rack without reference to right or left. The side edges of yoke-ends 50 of all the stops are roughened as at 54 and converge toward the open ends of the stops so that a good finger-grip is provided. Each tabulator-stop may be provided with a clip 47A secured as by riveting 47B to said tabulator-stop and providing spring-fingers 55 which snap about the corners of the rack to hold the tabulator-stops yieldably but firmly in place, as in Figure 11.

The counter-stop 47 is mounted on the carriage for pivotal movement so that a head or abutment end 56 thereon may be swung up to clear the margin-stops and down to engage the intermediate tabulator-stops. The counter-stop normally engages the margin-stops but clears the tabulator-stops.

Figures 1, 2, 3:
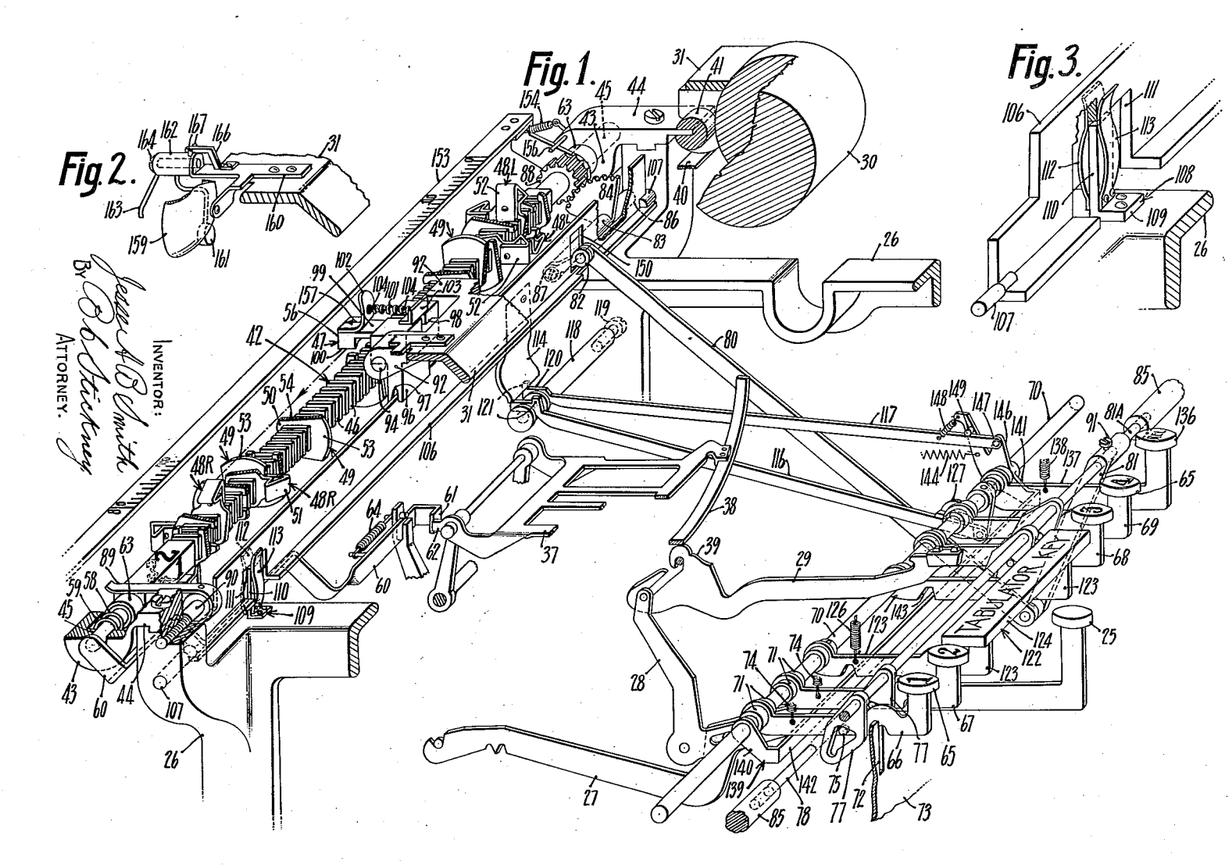
Figure 1 is a perspective of part of a typewriter showing the invention as incorporated therein, some of the parts being broken to illustrate the construction.
Figure 2 is a perspective view of the bell and mounting therefor as it would appear in position adjacent the counter-stop shown in Figure 1.
Figure 3 is an enlarged perspective of the device employed in yieldably retaining the counter-stop operating plate in neutral position.
Figure 12:
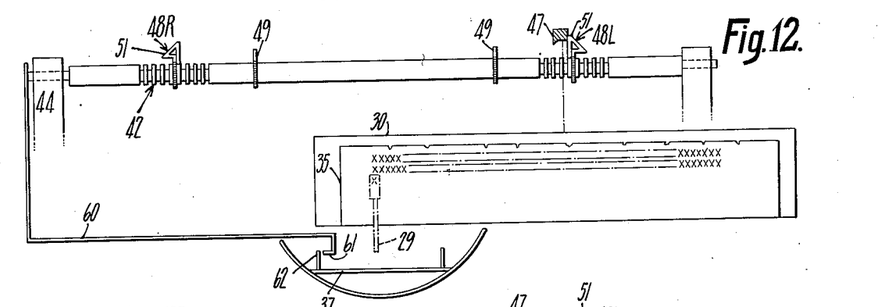
Figure 15:
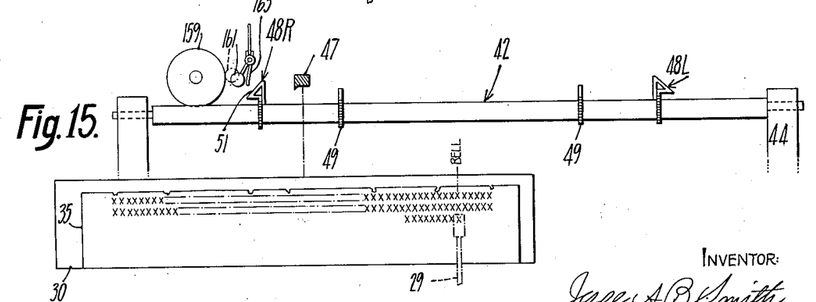
Figure 16:
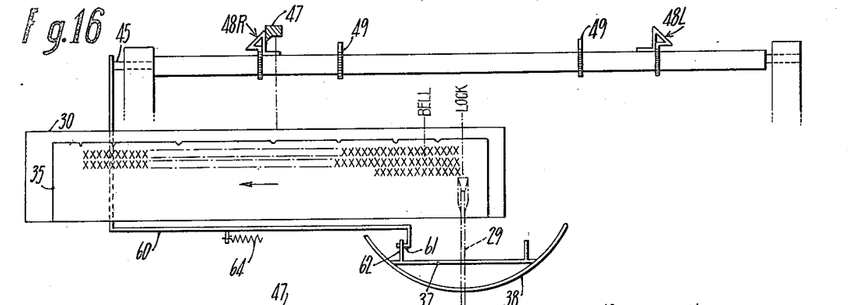
Figure 19:
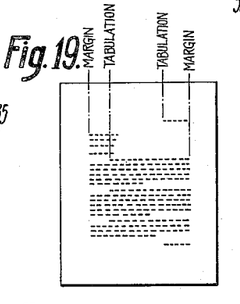
Figure 20:
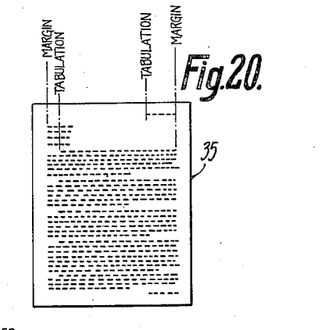

The stop set-up on face "2" of the rack as seen in Figure 1 will set the margins and intermediate tabulating points on work-sheet 35 for a letter of medium length so that a letter arranged as shown in Figure 19 can be produced. Rack 42 is revolvable to bring any selected face uppermost and in Figures 12 to 17, inclusive, face "3" of the rack is uppermost to provide a stop set-up for handling a long letter (Figure 20). As each line of typing is completed, the carriage is returned until the right-hand face of counter-stop 47 abuts flat face 52 of margin-stop 48L at the right-hand side of the stop-rack to establish a narrow left-hand margin on the work-sheet (Figure 12). As the typing proceeds and the end of the line approaches, a bell-mechanism mounted on the carriage adjacent the counter-stop rides over the margin-stop 48R at the left-hand side of the rack to give the usual warning (Figure 15). Shortly thereafter the left-hand face of the counter-stop engages the flat face 52 of margin-stop 48R at the left side of the rack to establish a narrow right-hand margin on work-sheet 35. When counter-stop 47 engages margin-stop 48R it will move stop-rack 42 one letter-space to the left against the resistance of a spring 58 which is coiled about the left journal 45 of the rack within a housing recess 59 in the bearing boss 43. This movement will lock the line inasmuch as an end of the journal 45 projecting beyond left boss 43 moves a lock-strip 60 to the left so that a tab-end 61 thereof is drawn into the path of an ear 62 on universal frame 37. This prevents rearward movement of the latter, thereby preventing printing action of the type-bars 29 (Figure 16). The endwise movement of the rack in either direction is limited to one letter-space by fixed collars 63 on the rack, which may engage the inside faces of the bosses 43.

Figure 17:
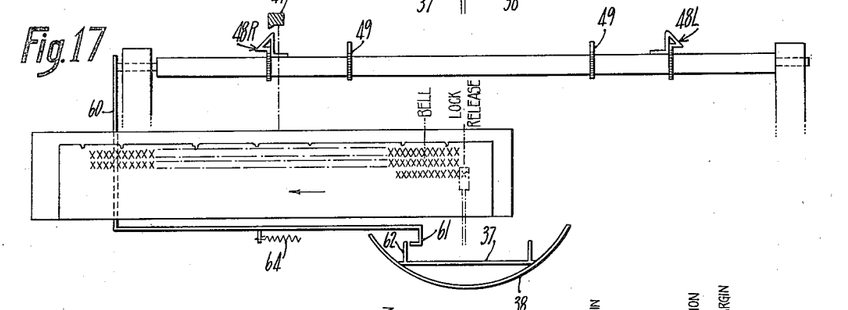
Figure 18:
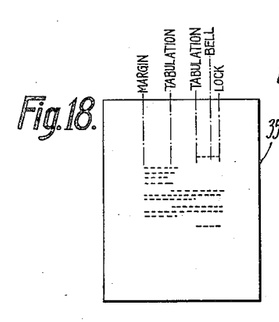

While counter-stop 47 remains against margin-stop 48R no typing can be done, but as soon as the counter-stop is thrown up, as will be later described, to disengage margin-stop 48R, the rack will move one letter-space to the right under the influence of spring 58 and a return-spring 64 on lock-strip 60. The latter will follow the movement of the rack-bar and permit normal operation of the type-bars beyond the margin established by stop 48R (Figure 17).

Figure 13:
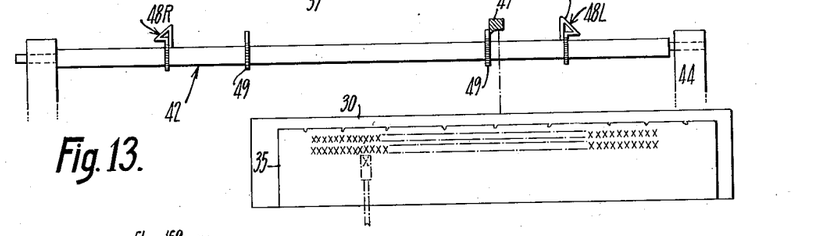
Figure 14:
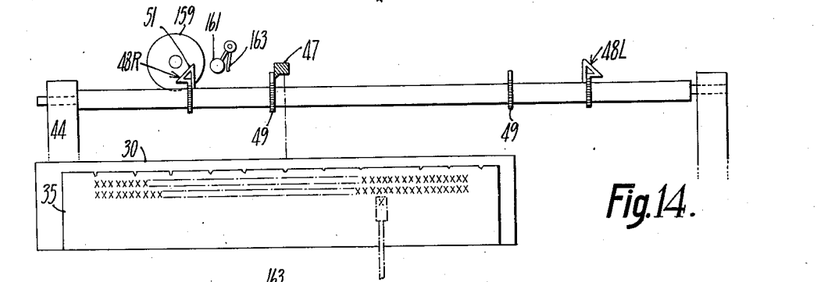
Figure 21:
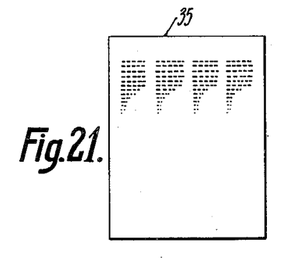

The relative positions of tabulator-stops 49 are shown in Figure 13 to establish the starting point of paragraphs at a distance inwardly from the margin in proportion to the length of the letter and in Figure 14 to establish the starting point of the date and closing lines so that neither will extend beyond the fixed right margin to detract from the appearance of the letter. The stop set-up on face "4" of rack 42 pre-arranges tabular or columnar matter on the work-sheet as shown in Figure 21.

It is evident that each of the faces "1", "2", "3" and "4" can have margin-stops and tabulator-stops arranged thereon in any desired manner. Thus, if a typist in a commercial establishment, for instance, is doing work which falls into say four or six general classes requiring marginal and intermediate position planning of matter on a work-sheet, or if she is using letter or work-sheets of varying widths that are used at random, she can set stops on each of the different faces of the rack to take care of the work to be done, and thereafter need only press a key of the keyboard in order to have a stop set-up that will automatically adjust the different kinds of work to the work-sheet.

The rack-face-selection mechanism includes particularly marked keys in a special bank of keys disposed across the top of the usual keyboard, for revolving the rack to turn any desired face thereof uppermost so that the stop set-up thereon is in position to be engaged by counter-stop 47. The specially marked keys, hereinafter referred to as rack-keys, include key-levers 66, 67, 68 and 69 (Figure 1) surmounted by the usual key-caps 65 bearing numerals "1", "2", "3" and "4" to correspond with the similarly identified stop-faces of rack 42. The rack-keys are pivotally mounted for swinging movement on cross-shaft 70, being confined between suitable collars 71 fixed to said shaft, which is journaled in frame 26. The rack-keys 66, 67, 68 and 69 are depressible in guide-slots 72 of frame-plate 73, against the action of individual springs 74. Each rack-key carries a cam-pin 75 which coacts with the cam-edge 76 of a plate-cam 77, one of which is arranged adjacent each rack-lever. The cams 77 are secured to cam-shaft 78 in any suitable manner. The shaft 78 at the left end is journaled in one of a pair of frame-sleeves 85 and at its opposite end is socketed in the boss-portion of lever-arm 81 whose extension 81A is journaled in the right frame-sleeve 85. The operation of any rack-key will, through its respective cam-pin 75 and cam 77, oscillate cam-shaft 78 to effect revolving movement of the stop-rack in a manner to be described.

Figures 4, 5, 6:
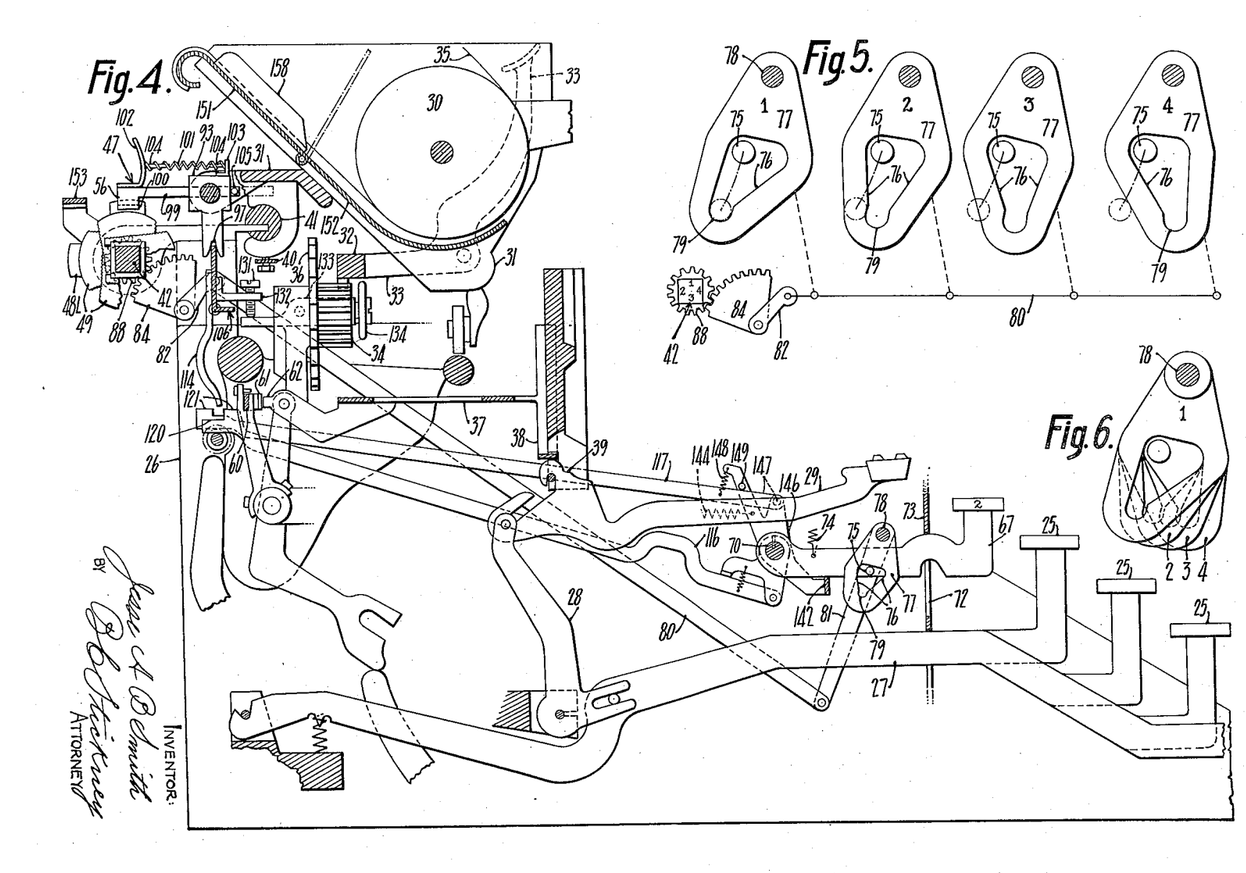
Figure 4 is a side view in sectional elevation of the typewriting machine showing the arrangement, accessibility and operating relation of the parts of the invention.
Figure 5 is a diagram view illustrating the action of the stop-bar-actuating cams used in bringing any desired face of said stop-bar into operating position.
Figure 6 is an end view of the cams shown in Figure 5, in assembled relation, the position thereof being that occupied when number "1" face of the rack is uppermost.

Referring to Figure 5, the cams 77 are designated "1", "2", "3" and "4" to correspond with their respective rack-keys and are shown in the positions they occupy with respect to each other when rack-key "1" has been depressed. The pin 75 of each key is in alignment with the pins of the other keys. A pin in action rides down cam-edge 76 to come to rest in a recess 79 in the bottom of cam 77 at the end of the operating stroke of the rack-key, as shown in outline in cam "1". The faces of the cams are in unaligned relation relatively to each other and with respect to the cam-pins and at this position of cam "1", the face "1" of stop-rack 42 is uppermost and is presenting the stop-group on said face for engagement by counter-stop 47, and the other cams occupy the respective positions shown in the assembled view (Figure 6) and in diagram (Figure 5). Depression of any rack-key, number "4" for instance, will cause its cam-pin 75 to ride down cam-edge 76 to swing cam "4" to the right with consequent turning movement of cam-shaft 78. It will be noted that cams "2" and "3" each employ two opposing cam-edges 76 while cams "1" and "4" each employ a single cam-edge 76. This is because cams "1" and "4" define the limits of oscillatory movement of the cam-shaft 78. With this arrangement of cams, operation of any rack-key will instantly turn rack 42 so that the face thereof corresponding to the depressed key will be uppermost.

The turning movements of cam-shaft 78 are transmitted to rack 42 through the medium of a link 80 which connects the arm-end 82 of a segment-sleeve 83 with the arm 81 adjustably secured to shaft 78 by set-screw 91. The segment-sleeve 83 is formed at its extremities to provide said arm-end 82 and a segment-gear 84. Sleeve 83 is held for rotary motion on a stud 86 by screw 87, the stud extending from one side of the machine-frame 26. Segment-gear 84 meshes with a pinion-gear 88 fixed to stop-rack 42 adjacent an end thereof, said pinion being of sufficient width to maintain mesh with the segment-gear when the rack moves. As illustrated in Figure 1, rack-key "2" has just been operated and its associated cam 77 has rotated shaft 78 enough to cause segment-gear 84 to rotate rack 42, through the connections described, so that face "2" of said rack is uppermost. A detent-spring 89 is mounted on a stud 90 at one side of frame 26 so that extended portions of said spring engage opposite sides of rack 42 to yieldably maintain the same in any selected position.

Figures 10, 11, 23, 24:
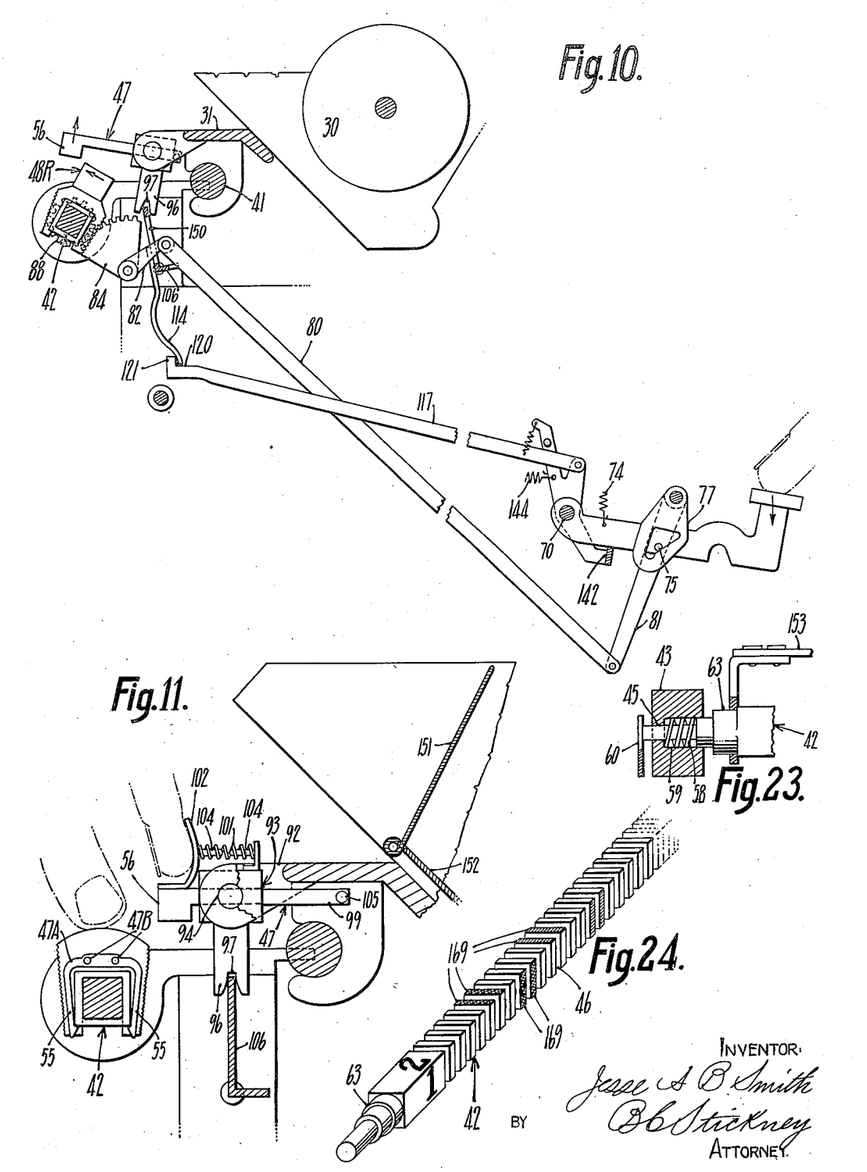
Figure 10 is a view similar to Figure 7 showing the action of a key-lever in rotating the stop-bar and in lifting the detent end of the counter-stop.
Figure 11 is an enlarged fragmentary section in side elevation of the stop-rack and the counter-stop showing how the latter can be retracted to facilitate the placing of stops on the rack.
Figure 23 is a view in section at the left end of the stop-shaft showing the mounting thereof.
Figure 24 is a view in perspective of part of the stop-rack showing the marking of certain teeth so that stops can be quickly placed in predetermined arrangement.

The counter-stop 47 and its associated parts and operation will now be described. Part of movable platen-carriage 31, at its center, is provided with spaced bearing-lugs 92 between which is disposed a counter-stop-rocker 93 supported for pivotal rocking motion on spindle-pins 94 which are mounted in lugs 92 and extend into said rocker 93 at the sides thereof. The rocker 93 consists of a rectangular block having a centrally-located depending saddle 96, the under edge of which is provided with a flute or groove 97. The rocker 93 has an inverted T-slot 98 extending downwardly from the top face thereof in which a counter-stop slide-bar 99 is held. The outer end of bar 99 is formed with the counter-stop head 56 previously referred to. This head constitutes the abutment portion of counter-stop 47 and on its under side has a depending lip 100 for engagement with tabulator-stops 49 when the counter-stop is tilted down. The head 56 is normally over the center of stop-rack 42 but may be retracted as shown in Figure 11 against the resistance of spring 101, which is located between a finger-piece 102 adjacent the outer end of slide-bar 99 and a bracket 103 suitably secured to said rocker 93, to facilitate the setting of stops in the stop-rack 42. The spring 101 is positioned over guide-pins 104 in the finger-piece and bracket, and maintains the slide extended to its limit which is defined by contact of a slide-bar lug or pin 105 with rocker-block 93 (Figure 11).

Rocking movement of the counter-stop is effected at any position of the carriage-travel by mechanism which is all mounted on typewriter frame 26 and includes a rock strip or bar 106 having trunnion-pins 107 journaled in the sides of said frame, the strip 106 being substantially L-shaped in cross-section for rigidity and extending practically the width of the frame. The upper edge of the rock-strip 106 extends through groove 97 in saddle 96 and the latter travels along the top edge of strip 106 as the carriage moves back and forth. The engagement of strip 106 with saddle 96 is such that rocker 93 will be swung pivotally in accordance with oscillations of said strip or bar 106 to tilt the head portion 56 of the counter-stop up or down.

Pivotal movement of rock-strip or bar 106 is accomplished for three different purposes. First, it is rocked to throw the head of the counter-stop down for engagement with paragraph or column stops in tabulating. Second, it is swung to tilt the head of the counter-stop up for disengagement from a margin-stop to effect margin-release. Third, it is actuated automatically by operation of any one of the rack conditioning keys 66, 67, 68 or 69 to throw the head of the counter-stop up so that, as said rack revolves, the stops thereon will not jam against the counter-stop and prevent rotation of the rack. In normal or neutral position rock-strip 106 is vertical and counter-stop 47 is horizontal. The normal vertical position of strip 106 is yieldably maintained by a spring keeper 108 consisting of a bracket 109 mounted on machine-frame 26. A vertical leg 110 of the bracket is disposed within an opening 111 of the rock-strip and is in alignment with said strip when the same is in normal position. Opposing leaf springs 112 and 113 are secured to bracket 109 so that the upper ends of the springs are in position to simultaneously contact the opposite sides of interjacent bracket-leg 110 and rock-strip 106. The springs close on the bracket-leg 110 and the portions of the springs that extend beyond said leg contact the opposite sides of the strip 106 to yieldably retain the same in normal or neutral position. Rock-strip 106 near one side of the machine-frame has riveted or otherwise secured thereto, a depending rock-plate or extension 114 which presents a lower edge slightly spaced above, and extending laterally of, the operating ends of tabulating lever-arm 116 and release-lever arm 117 which are actuated to swing the rock-strip 106 on its pivot. The ends of the lever-arms 116, 117 underlying the plate 114 are free and rest on a stud 118 that extends inwardly from one side of the machine-frame and is secured thereto by a screw 119. The free ends of arms 116, 117 each present an upper contact-edge 120 for engagement with the bottom edge of plate 114 and also a tab or lug 121 for engagement with the sides of the plate.

Figures 7, 8:
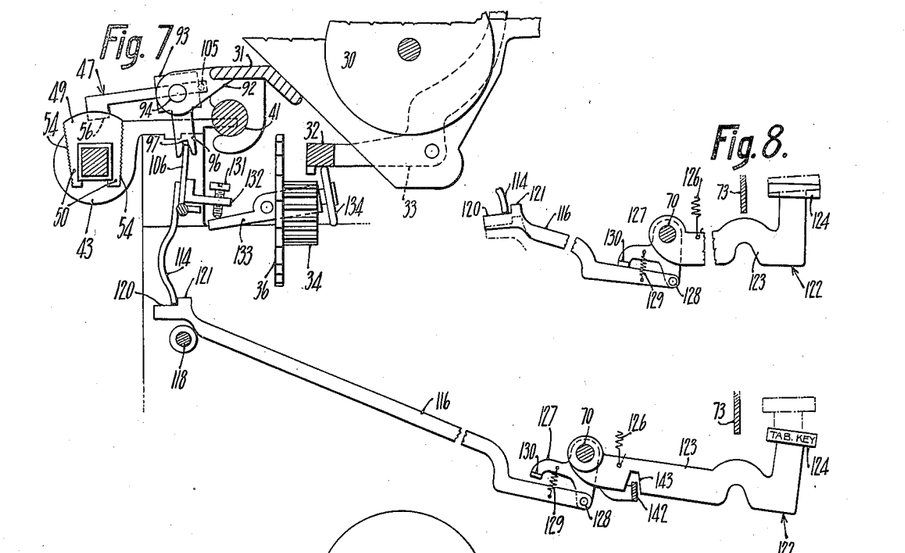
Figure 7 is a side view in sectional elevation taken through the typewriter and illustrating the action of the tabulating key in releasing the carriage and depressing the counter-stop so that the latter is in the path of a rack-stop.
Figure 8 is a fragmentary showing of a portion of Figure 7 illustrating the initial action of the tabulator-key lever and its associated member.

For tabulating, counter-stop 47 is tilted so that head 56 thereof is depressed to engage a tabulator-stop 49 by operation of a tabulator-key 122 which is preferably placed between the rack-conditioning keys in the special key-bank. The tabulator-key 122 consists of key-levers 123 surmounted by finger-bar 124 which is suitably designated, the key-levers 123 being secured to shaft 70 for turning the latter. As shown in Figure 8, initial depression of key 122 against the resistance of its spring 126 rocks shaft 70 and with it attached lift-link 127 to which is pivotally secured as at 128 an end of arm 116. A spring 129, connecting link 127 and arm 116, and a foot 130 on link 127, against which lever-arm 116 is drawn by spring 129, provide a yielding joint between link 127 and arm 116. Initial movement of the tabulator-key, therefore, raises arm 116 until its edge 120 contacts plate 114. Continued depression of tabulator-key 122 swings link 127, oscillation being permitted after contact of arm 116 and plate 114 by separation of link-foot 130 from arm 116 against resistance of spring 129, to push arm 116 rearwardly so that lug 121 thereon swings rock-bar 106 as shown in Figure 7. As the rock-bar swings, a screw 131, adjustably threaded into a bracket 132 secured to said bar, engages one end of a usual release-lever 133, a wheel 134 of which lifts the letter-feeding rack 32 out of engagement with pinion 34 to free the platen-carriage from escapement control. The carriage, thus freed, jumps, in tabulating movement, in letter-feed direction. Concomitantly with the swinging movement of rock-strip 106, counter-stop 47 is rocked so that head 56 thereof is in lowered position to engage a tabulator-stop 49 to arrest movement of the carriage. Adjustment of screw 131 permits proper relative action of the counter-stop and carriage-release.

Figure 9:
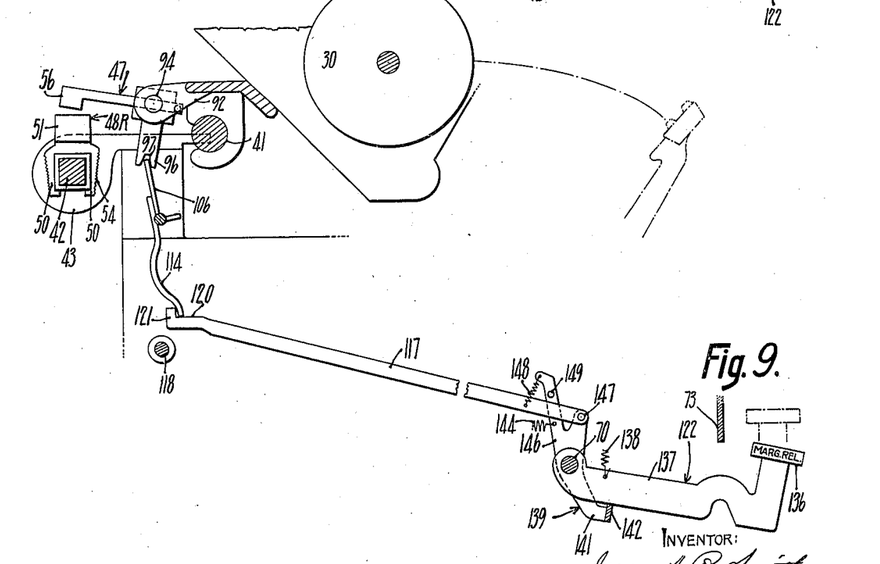
Figure 9 is a view similar to Figure 7, illustrating the action of the margin-release key in raising the detent end of the counter-stop out of the range of a margin-stop.

In Figure 9, mechanism for effecting margin-release is shown, including a margin-release key 136 and its lever 137, which pivots freely on shaft 70 against the resistance of spring 138. The margin-release action of rocking the counter-stop to raise head 56 thereof to clear the margin-stops is the same means employed to raise the counter-stop for stop-clearance when the rack-keys are actuated to revolve the stop-rack. A special margin-release key is necessary because, while operation of any of the rack-keys imparts a movement to the counter-stop similar to margin-release action, the rack-keys cannot be used for margin-release without disturbing the adjusted position of the rack. In carrying out the margin-release or stop-clearing movement of the counter-stop, use is made of a bail-lever 139, the opposite ends 140 and 141 of which are pivoted for free oscillation on shaft 70 at opposite ends of the special key-bank. The connecting or intermediate portion between said ends 140 and 141 constitutes a universal bar 142 which underlies all the key-levers of said special key-bank and is actuable by any except tabulator-key 122 whose key-levers 123 are provided with cut-outs 143. These cut-outs provide for operation of tabulator-key 122 without operating universal bar 142. The upper edge of the latter is maintained against the lower edge of key-levers 66, 67, 68, 69 and 137 by spring 144.

End 141 of bail-lever 139 is extended as at 146 to provide a pivotal fastening 147 for release-lever arm 117 to universal bar 142. A spring 148, connecting bail-end extension 146 with arm 117, and a pin 149 on extension 146, against which arm 117 is drawn by spring 148, provide a yielding joint between the arm 117 and the universal bar. Initial movement of margin-release key 136, or any of the rack-keys 66, 67, 68 or 69 swings universal bail 139 to raise arm 117 so that edge 120 thereof comes into contact with the bottom edge of plate 114. Continued downward movement of a key referred to will swing the universal bail to draw on arm 117 so that lug 121 thereon engaging plate 114 will oscillate rock-bar 106 to raise counter-stop head 56 out of the way of any stop. The swing of the universal bail, after contact of arm 117 with plate 114, is provided for by separation of pin 149 and arm 117 against the resistance of spring 148 (Figure 10), the action being similar to that in connection with arm 116 and lift-link 127. Upper edge 120 and lug 121 form a notch or shoulder in each arm 116 and 117 for engagement with the lower edge of plate 114 when arms 116, 117 are raised. As seen in Figure 4, the bottom edge of plate 114 is above lugs 121 when arms 116, 117 are at rest on stud 118.

In Figure 10, one of the rack-keys has almost completed its down stroke, the pin 75 thereof acting on cam 77 to almost complete a turning movement or stop-selecting set-up of rack 42 through link 80. Concurrent with the down movement of the key-lever, the universal bail rocks to cause head 56 of counter-stop 47 to swing up so that a rack-stop will clear the head as the rack revolves. An opening 150 in rock plate or bar 106 permits operation of arm-end 82 and link 80 in turning the rack.

In using the invention, the margin and tabulator stops may be initially set with convenience from the front of the machine by swinging upper hinged section 151 of paper-table 152 forwardly to reveal rack 42, into which the stops may be set in accordance with scale 153, the graduations of which correspond with those of a usual front scale (not shown). Scale 153 is mounted on the journal portions of rack 42 for swinging movement so that it can be pushed down out of the way against the resistance of spring 154 to facilitate the insertion of stops. The spring normally holds the scale up against pin 156 in bearing boss 43. The scale may be dispensed with in setting the stops and as the carriage is moved, they may be placed in alignment with an indicator or pointer marking 157 on the counter-stop finger-piece 102, the counter-stop being retractable for insertion of the stops (Figure 11). The pointer 157 coincides with the printing point of the type-bars. Also, the initial setting of the stops may be facilitated by the means illustrated in Figure 24, which consists in prominently marking certain teeth of each face of the stop-rack 42 as at 169. The markings may be colored or knurled to indicate the places where stops can be initially set to arrange for the placing of letters or the like of average form on the work-sheet. In order that the work-sheet can be located in proper relation to any selected stop set-up, a side-edge gage 158 may be mounted for lateral adjustment, on paper-table section 151.

When the stops have been set up on each face of the rack as desired, the work-sheets are positioned about the platen against side-edge gage 158. Key "2" being pressed, positions face "2" of rack 42 uppermost and the margin and tabulator stops coact with the counter-stop to arrest movement of the carriage in margin and intermediate tabulator-positions as the writing proceeds. Before the margin-lock operates, a bell-mechanism on the carriage gives usual warning to the operator. Bell 159 is attached to bracket 160 mounted on carriage 31 adjacent counter-stop 47, and is sounded by hammer 161. The hammer is attached to a rock-sleeve 162 whose depending finger 163 is in the path of the margin-stops. Sleeve 162 mounted on bracket-stud pin 164 for turning movement is yieldably held by the association of spring 166 and pins 167 so that the bell-hammer strikes bell 159 only when finger 163 rides over a margin-stop as the carriage moves in letter-feeding direction. The bell and counter-stop both being mounted on the carriage a fixed distance apart, the bell will ring at the same point from the end of each line without regard to the position of the margin-stop.

Figure 22:
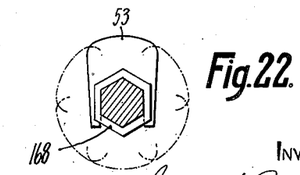
Figure 22 is a view in cross-section of a modified form of stop-carrying rack showing a stop in position on each face thereof.

In order to increase the scope of work that may be accommodated by having a greater number of selective sets of stops, stop-rack 168 as shown in Figure 22 may be hexagonal in cross-section to provide six faces. On each face a complete set of stops, similar to the margin and tabulator stops herein referred to, may be set up. The recess 79 in the bottom of each cam 77 prevents overthrow of the rack as the same is revolved to any selected position.

Variations may be resorted to within the scope of the invention, and portions of the improvements may be used without others.

Having thus described my invention, I claim:

1. In a typewriting machine, the combination with relatively movable frame and carriage parts, of a movable rack on one of the parts, a counter-stop on the other part, groups of stops on the rack for presentation to said counter-stop when the rack is moved, keys at the front of the machine, and means intermediate the keys and the rack for moving the rack to selectively present any desired group of stops to said counter-stop.

2. In a typewriting machine, the combination with frame and carriage members, of a stop-rack on one of the members, stops on the rack providing sets, each set defining different marginal and intermediate carriage-arrest positions in accordance with lines of typing of such predetermined lengths as are necessary to fit work of different estimated lengths to a work-sheet, a counter-stop on the other member, and means for selectively moving the rack to present any desired set of stops for coactive relation with said counter-stop.

3. In a typewriting machine having a keyboard, the combination with a frame and a carriage movable on the frame, of a stop-rack on one of the parts, a counter-stop on the other part, means for moving the rack, and settable stops on the rack arranged in groups for selective presentation to the counter-stop upon movement of the rack, the coactive relation of the counter-stop and rack-stops controlling the movement of the carriage, and the stop-rack-moving means including a part of the machine-keyboard.

4. In a typewriting machine, the combination with a frame-member and a carriage-member movable thereon, of a rack rotatably mounted on one of the members and providing stop-faces, means for rotating the rack, a counter-stop on the other member, a group of stops on each face of the rack, means for moving the counter-stop into stop-coacting position, and means controlled from the keyboard of the machine for actuating the rack-rotating means and the counter-stop-moving means.

5. In a typewriting machine, the combination with a frame-member and a relatively movable carriage-member, of a rack movably mounted on one of the members, means for moving the rack, a counter-stop on the other member, settable stops arranged on the rack in longitudinally aligned groups, said groups being selectively presentable to the counter-stop by movement of the rack, the counter-stop being normally in position to coact with some of the stops of a group, and means for moving said counter-stop into position to coact with the other stops of said group, whereby the coactive relationship of the stops and counter-stop control the movement of said carriage.

6. In a typewriting machine having printing type-bars, the combination with a frame-member and a relatively movable carriage-member, of a stop-rack mounted in one of the members for rotary and endwise movement, a counter-stop on the other member, means for rotating said rack, stops on the rack arranged for presentation in groups to the counter-stop by rotation of the rack, said counter-stop coacting individually with the stops of a group to limit the movements of the carriage and move the rack endwise, and means operable by the endwise movement of the rack for preventing printing operation of the type-bars.

7. In a typewriting machine, the combination with a frame-member and a carriage-member movable thereon, of a stop-rack mounted in one of the members, means for moving the rack, a counter-stop on the other member, stops on the rack providing groups selectively presentable to the counter-stop by movements of the rack, each group of stops defining different marginal and intermediate carriage-arrest positions in accordance with lines of typing of such predetermined lengths as are necessary to fit work of estimated length to a work-sheet, the counter-stop being normally in position to coact with some of the stops of a group to arrest the movement of the carriage at the line-ends, and means for moving the counter-stop into position to coact with other stops of a group to arrest the carriage at positions intermediate the line-ends.

8. In a typewriter having a printing organization including a keyboard, the combination with a movable carriage, of a stop-organization comprising individual groups of carriage-control stops, each group including margin and intermediate tabulator stops, and each group providing different marginal and tabulating carriage-arrest positions, whereby work of different lengths can be arranged on a work-sheet in accordance with the length of said work, a counter-stop, and means including part of the keyboard and operable selectively to present any selected individual group of stops for coactive relation with said counter-stop.

9. In a typewriting machine, the combination with a frame-member and a carriage-member movable thereon, of a rack movably mounted on one of the members, a counter-stop on the other member, means for moving said rack, and groups of stops on the rack, each group including margin-stops and intermediate tabulator-stops for selective presentation to the counter-stop when the rack is moved, and the stops of each group being arranged relatively to each other for coactive relation with the counter-stop to control the movements of the carriage in accordance with a predetermined length of line necessary to accommodate matter of approximated length to a work-sheet.

10. In a typewriting machine, a frame-member, a carriage-member movable relatively thereto, a counter-stop in one of the members, a stop-rack in the other member providing a plurality of identified faces, keys each marked to correspond with an identified face of the stop-rack, and means for moving the stock-rack for selective presentation of a desired face thereof to the counter-stop upon actuation of a key designated to correspond with said desired face of the stop-rack.

11. In a tabulating mechanism, a stop-rack providing a plurality of faces for use selectively and along each of which stops are settable, a cam-shaft, cams on the shaft, pivotally mounted key-levers, a cam-pin on each lever, all of said pins being in alignment and each co-operable individually with its respective cam to actuate said cam-shaft a varying degree, and means connecting said rack with said cam-shaft, whereby the rack is moved by actuation of a key-lever.

12. In a tabulating mechanism, the combination with a rack having stops thereon and a counter-stop for coactive relation with the stops on the rack, of means for rotating the rack to selectively position the stops thereof, and means for moving the counter-stop out of said coactive relation concomitantly with the rotation of said rack.

13. In a typewriting machine, in combination, a tabulating mechanism including a movable stop-rack, groups of stops on the rack, each group including margin and tabulator stops, a counter-stop for co-operation with the said stops, means for selectively moving the stop-rack to position said groups of stops relatively to the counter-stop, including rack-keys, and means for moving the counter-stop to clear the stops of the rack, and part of said counter-stop-moving means being common to said rack-moving means for moving the counter-stop to clear the stops of the rack when any rack-key is actuated.

14. In a typewriting machine having a movable carriage, the combination with a tabulating mechanism including a stop-rack, spaced margin and tabulator stops on the rack, and a counter-stop for co-operation with said stops to control the movements of the carriage, of a rock-bar with which said counter-stop has sliding relation, means for swinging said rock-bar to move the counter-stop in one direction to engage the tabulator-stops and in another direction to clear the margin-stops, said swinging means including lever-arms, lift links for raising the ends of said arms into operative association with said rock-bar and therefater moving said links to swing the rock-bar, and key-levers for selectively actuating said rock-bar-swinging means at any position of the carriage.

15. In a typewriting machine, the combination with a rack presenting settable tabulator-stops, a movable carriage and letter-feed control for the carriage, of a counter-stop on the carriage for engaging the stops to control the tabulator-jump movements of the carriage, means for swinging the counter-stop to engage the tabulator-stops and releasing the carriage from letter-feed control for tabulating-jump movement including a rock-bar extending laterally of the machine, a saddle on the counter-stop for sliding engagement with said rock-bar, whereby movements of the bar are transmitted to the counter-stop at any carriage position, an extension on the rock-bar for releasing the carriage from letter-feed control simultaneously with the swinging movement of the counter-stop, a lever-arm normally out of engagement with said rock-bar, and key-operated means for lifting the lever into contact with the rock-bar and then moving the lever to actuate the rock-bar.

16. In a typewriting machine, the combination with a frame-member, a carriage-member, type-bars for printing coaction with the carriage and a universal bar movable by the type-bars in printing, of a stop-rack mounted for endwise movement in one of the members, a spring for yieldably resisting said movement, settable stops on the rack, a counter-stop for tabulating cooperation with said stops, engagement of the counter-stop with a settable stop forcing the rack endwise to take up the impact of stop and counter-stop collision, a line-lock member movable by the endwise movement of the rack to engage the universal bar, whereby printing action of the type-bars is arrested, and means for moving the counter-stop out of contact with a settable stop to permit said spring to return the rack to normal position and the line-lock member to disengage said universal bar.

17. In a typewriting machine, the combination with a frame-member and a carriage-member movable on the frame, of a stop-rack rotatably mounted on one of the members, sets of stops on the rack, a counter-stop on the other member for coactive relation with the sets to control the movements of the carriage, means for moving the stop-rack to selectively position the sets of stops including rack-keys, a cam-shaft, cams operated by the rack-keys for turning the shaft different amounts, an operating train connecting said cam-shaft and said rack including a segment, a segment-operated pinion on the stop-rack and a linkage connecting said segment with said cam-shaft, and a key-actuated means for moving the counter-stop into coactive relation with the stops.

18. In a typewriting machine, the combination with a frame-member and a carriage-member movable on the frame, of a stop-rack rotatably mounted on one of the members, sets of stops on the rack, a counter-stop on the other member for coactive relation with said stop-sets to control the movements of the carriage, means for moving the stop-rack to selectively position the sets of stops including rack-keys, means for moving the counter-stop into coactive relation with some of the stops including a tabulator-key, and means for moving the counter-stop out of coactive relation with all the stops including a margin-release key and a bail underlying all of the keys, and said bail being operable by all except the tabulator-keys to cause movement of the counter-stop out of coactive relation with all the stops, whereby the rack may be rotated by the rack-keys without the stops thereon interfering with said counter-stop.

19. In a typewriting machine, the combination with a frame and a carriage movable thereon, of a combined margin-gage and carriage-tabulating mechanism, including a rotatable bar on said carriage, having complemental margin-stops mounted on each face thereof, a counter-stop upon the machine-frame normally in co-active relation with said margin-stops, tabulator-stops mounted between the margin-stops on each face of said bar, said counter-stop being out of the paths of said tabulator-stops, means for releasing the carriage and moving said counter-stop into the tabulator-stop path, and means for detaining the bar in different rotative positions for using selectively different sets of margin and tabulator stops.

20. In a typewriting machine, the combination with a frame and a carriage movable thereon, of a combined margin-gage and carriage-tabulating mechanism, including a rotatable bar on said carriage, having complemental margin-stops mounted on each face thereof, a counter-stop upon the machine-frame normally in co-active relation with said margin-stops, tabulator-stops mounted between the margin-stops on each face of said bar, said counter-stop being out of the paths of said tabulator-stops, means for releasing the carriage and moving said counter-stop into the tabulator-stop path, and means for detaining the bar in different rotative positions for using selectively different sets of margin and tabulator stops, the tabulator-stops and margin-stops on each face of said bar being adjustable independently of one another and independently of the stops on the remaining faces of the bar.

21. In a typewriting machine, the combination with a frame and a carriage movable thereon, of a combined margin-gage and carriage-tabulating mechanism, including a rotatable bar on said carriage, having complemental margin-stops mounted on each face thereof, a counter-stop upon the machine-frame normally in co-active relation with said margin-stops, tabulator-stops mounted between the margin-stops on each face of said bar, said counter-stop being out of the paths of said tabulator-stops, means for releasing the carriage and moving said counter-stop into the tabulator-stop path, means for detaining the bar in different rotative positions for using selectively different sets of margin and tabulator stops, and means for moving said counter-stop out of normal position to clear said margin-stops.

22. In a typewriting machine, the combination with a frame and a carriage movable thereon, of a combined margin-gage and carriage-tabulating mechanism, including a rotatable bar on said frame, having complemental margin-stops and tabulator-stops intermediate the margin-stops in longitudinal array on each face thereof, a counter-stop normally in co-active relation with said margin-stops and out of the path of said tabulator-stops, means for determining the rotative position of said bar, and means selectively setting said counter-stop into the path of said tabulator-stops or out of the path of said margin and tabulator-stops at will.

23. In a typewriting machine, the combination with a frame and a carriage movable thereon, of a combined margin-gage and carriage-tabulating mechanism, including a rotatable bar on said frame, having complemental margin-stops and tabulator-stops intermediate the margin-stops in a longitudinal array on each face thereof, a counter-stop normally in co-active relation with said margin-stops and out of the path of said tabulator-stops, means for determining the rotative position of said bar, and means selectively setting said counter-stop into the path of said tabulator-stops or out of the path of said margin and tabulator-stops at will, said counter-stop setting means comprising a rock bar operatively mounted on the frame, a saddle on the carriage, operatively associated with said counter-stop and straddling said rock bar, and means for rockably setting said rock bar.

JESSE A. B. SMITH.